May 9, 1939.  O. BULOW  2,157,477
FISHHOOK CONNECTOR AND SPREADER
Filed Dec. 20, 1937
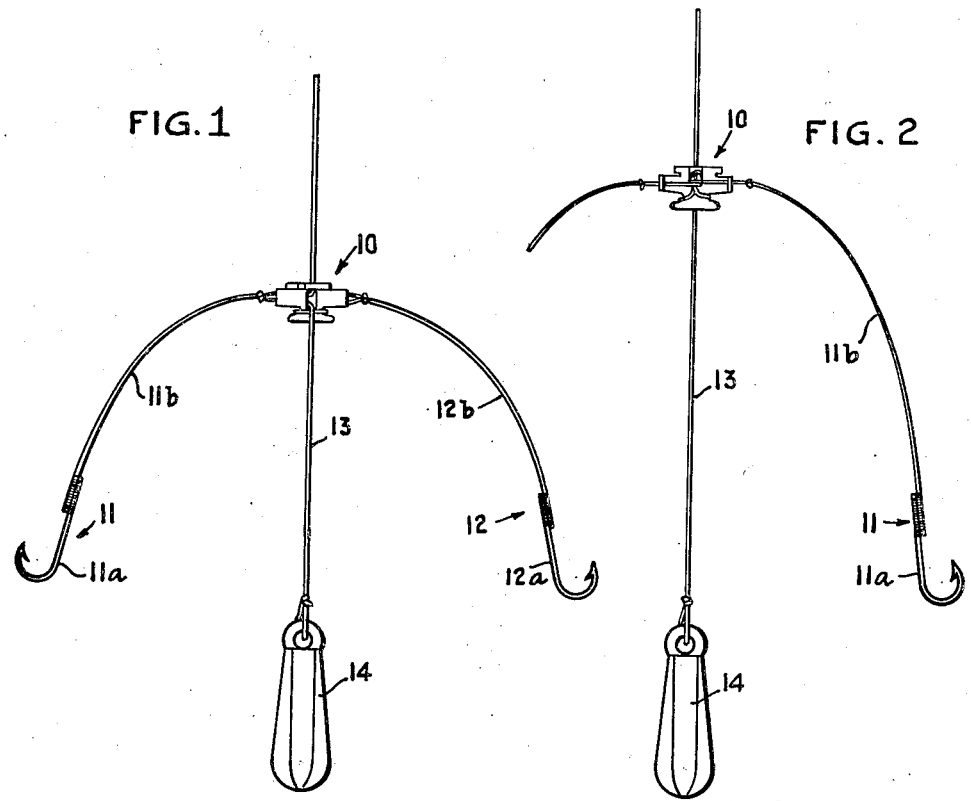
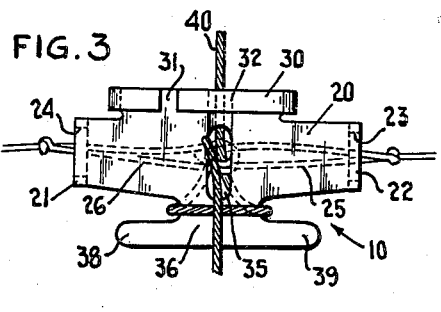
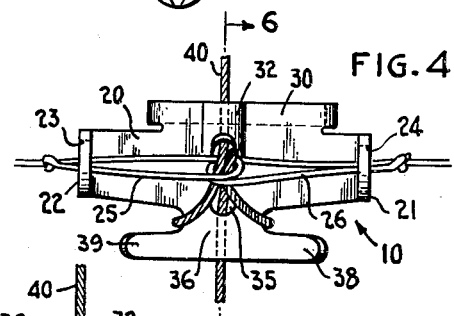
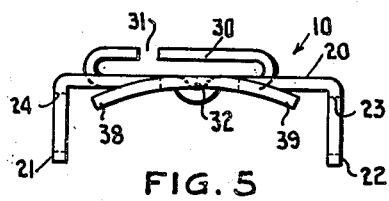
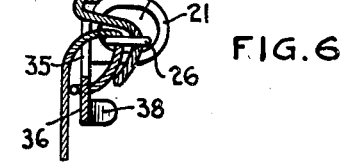
OTTO BULOW
INVENTOR
BY *Victor J. Evans & Co.*
ATTORNEYS Patented May 9, 1939

2,157,477

UNITED STATES PATENT OFFICE 2,157,477

FISHHOOK CONNECTOR AND SPREADER

Otto Bulow, St. Albans, N. Y.

Application December 20, 1937, Serial No. 180,910

5 Claims. (Cl. 43—28)

This invention relates generally to devices useful in conjunction with fishing lines and the like and more especially to improved means for connecting a plurality of fishing hooks to a line and for holding same in spaced relationship.

It is a major object of the present invention to provide means for connecting a plurality of fishing hooks to a line whereby the hooks are maintained substantially perpendicular to said line and disposed in spaced relationship to each other.

It is also an object of the present invention to provide a connector and spreader of the type referred to, characterized in that the units comprising the structure are maintained in substantial equilibrium, that is to say that the hooks are evenly balanced and disposed upon opposite sides of the line.

It is also an object of the present invention to provide a device of the type referred to which can be moved easily along the line without dissociating the hooks therefrom but which maintains the line substantially centered relative to the hook members and appurtenant apparatus.

Among notable features of the device according to the present invention are that the hooks can be easily and quickly dissociated from the connected member and from the line without entangling the latter; that it is unnecessary to form any knots in the line to attach the hooks thereto when using the connector member; that a pull upon one or several of the hooks does not in any wise loosen any of the hooks from engagement with the line and that the hooks are at all times held in spaced relationship relative to each other whereby entanglement is at least largely precluded.

Other objects, advantages and features of the device according to the present invention will be apparent to those skilled in the art during the course of the following description wherein a specific embodiment of the present invention, herein illustrated, will be described, it being clearly understood that the specific embodiment referred to is given solely by way of example and is non-limitative.

In the drawing—

Fig. 1 is a front elevational view of a preferred embodiment of the present invention shown in position and associated with a line;

Fig. 2 is a rear elevational view of the device illustrated in Fig. 1, shown in a slightly different position upon the line;

Fig. 3 is a front elevational view of a connector and spreader member according to the preferred embodiment of the present invention, shown in association with a portion of a line and portions of a pair of fish hooks;

Fig. 4 is a rear elevational view of the fish hook connector and spreader illustrated in Fig. 3 along with associated structures therein referred to;

Fig. 5 is substantially a top plan view of the fish hook connector and spreader; and Fig. 6 is a sectional view of Fig. 4 taken along the line 6—6.

Regarded in certain of its broader aspects, the device according to the present invention comprises a U-shaped member consisting of a cross piece and arms, each of said arms having an opening formed therein adapted to receive looped portions of a line carrying a fish hook, a backwardly projecting flattened ring-like member attached to a portion of said cross piece adapted to receive a fishing line, an opening formed near the midpoint of said cross piece adapted to receive a loop formed in said line and a backwardly projecting arcuately curved shoulder on a portion of said cross piece whereby a loop formed in said line and passed through said opening can be disposed around said projecting shoulder portion.

In order to facilitate an understanding of the present invention a preferred embodiment thereof, herein illustrated, will be described.

Referring now to the drawing and particularly to Figs. 1 and 2, a fish hook connector and spreader generally designated at 10, carrying a pair of fish hooks generally indicated at 11 and 12, is shown associated with a line 13 attached to a sinker 14. It will be noted that the fish hooks 11 and 12 comprise a hook portion proper generally designated at 11a and 12a and a flexible cord-like extension member 11b and 12b. The extension pieces are formed at the free end to present a loop-like structure and it is in conjunction with this type of fish hook and line that the device according to the present invention most satisfactorily functions.

Referring now to Figs. 3, 4 and 5, the connector and spreader member generally designated at 10 comprises a U-shaped member consisting of a cross piece 20 having outwardly projecting arms 21 and 22, each of said arms being provided with openings 23 and 24, substantially as shown, said openings being adapted to receive looped portions 25 and 26 associated with the flexible line of fish hooks as hereinbefore referred to.

The upper portion of the cross piece 20 of the U-shaped member is provided with a projecting part near the midpoint formed to present a flattened annular member 30 substantially as shown, it being noted that the lugs defining said annular member do not meet whereby an opening 31 in the annulus is provided. It is further to be noted that the annulus projects backwardly from the U-shaped member and that the opening 31 is not disposed near the mid portion of the U-shaped cross piece. A channel 32 formed in portions of the annulus 30 and the cross piece 20 is positioned near the midpoint of said cross piece and disposed in a substantially vertical direction, said channel terminating in an opening 35 formed in said cross piece substantially as shown. A T-shaped projecting lug 36 formed integral with said cross piece 20 is disposed adjacent but below said opening 35. It is provided with arcuately curved arms 38 and 39, said arms being bent forwardly to present a surface substantially as illustrated.

In use a pair of fish hook loops, such as indicated at 25 and 26, is positioned within the openings 23 and 24 formed in the arms 21 and 22. A loop formed in the fishing line 40 is passed through the opening 35 and through the loops 25 and 26 associated with the fish hooks, and the projecting loop of the line is then positioned around the lug 36 and beneath the arms 38 and 39 thereof, after which when the line is pulled tight, or at least substantially so, the line and fish hook-carrying loops will be disposed in substantially the relationship illustrated in the figures.

It will be noted that the fish hooks carried on the line in the manner hereinbefore referred to are substantially evenly balanced relative to each other and that the sinker line or its equivalent is maintained substantially centered relative to the connector and fish hooks at all times. Assuming, for instance, that there is a pull upon one of the fish hooks, it will be noted that the lower portion of the line to which the sinker is attached is moved over the curved face of the lower projecting lug but when the pull is released the connector and associated elements will be returned to their nomal position. It is also notable that the channel 32 at least tends to hold the line centrally disposed as hereinbefore maintained. If it is desired to move the connector and associated members along the line, it will be apparent that this can be accomplished without dissociating the connector and/or hooks thereof merely by forming a loop in the line and passing the slack through the connector. It will be apparent that under normal conditions entanglement of the hooks carried by the connector and spreader is at least largely precluded and likewise entanglement of the hooks with the line. When it is desired to dissociate the connector from the hooks and/or the line, it will be apparent that this is readily and easily accomplished by extending the loop positioned around the projecting lug 36 and reversing the steps whereby the hooks were originally associated with the line. Hence, it will be apparent that under no conditions can knotting occur in the line due to the connector used or its method of connection.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A new and improved fish hook connector and spreader of the type described, comprising a U-shaped member having a substantially centrally positioned opening formed therein and openings formed in each of the arms thereof, said last named openings being adapted to receive end loop portions of flexible lines carrying fish hooks thereon, an annular shaped member carried on and formed integral with said U-shaped member and positioned adjacent but above the centrally located opening formed therein, and a T-shaped lug carried on and formed integral with said U-shaped member and positioned adjacent but below the centrally located opening formed therein.

2. A new and improved fish hook connector and spreader of the type described, comprising a U-shaped member consisting of a horizontal cross piece having a substantially centrally positioned opening formed therein and a pair of arms formed integral with and forwardly extending from end portions of said cross piece, each of said arms having an opening formed therein adapted to receive an end loop portion of a flexible line carrying a fish hook, a horizontally positioned backwardly projecting substantially flattened annular shaped member carried on and formed integral with said cross piece and positioned adjacent but above the centrally located opening formed therein, and a T-shaped lug carried on and formed integral with said cross piece and positioned adjacent but below the centrally located opening formed therein.

3. A new and improved fish hook connector and spreader of the type described, comprising a U-shaped member consisting of a horizontal cross piece having a substantially centrally positioned opening formed therein and a pair of arms formed integral with and forwardly extending from end portions of said cross piece, each of said arms having an opening formed therein adapted to receive an end loop portion of a flexible line carrying a fish hook, a horizontally positioned backwardly projecting substantially flattened annular shaped member carried on and formed integral with said cross piece and positioned adjacent but above the centrally located opening formed therein, the outer portion of said annular member being broken near a side thereof to provide a passage therethrough, and a T-shaped lug carried on and formed integral with said cross piece and positioned adjacent but below the centrally located opening formed therein.

4. A new and improved fish hook connector and spreader of the type described, comprising a U-shaped member consisting of a horizontal cross piece having a substantially centrally positioned opening formed therein and a pair of arms formed integral with and forwardly extending from end portions of said cross piece, each of said arms having an opening formed therein adapted to receive an end loop portion of a flexible line carrying a fish hook, a horizontally positioned backwardly projecting substantially flattened annular shaped member carried on and formed integral with said cross piece and positioned adjacent but above the centrally located opening formed therein, the outer portion of said annular member being broken near a side thereof to provide a passage therethrough, and a T-shaped lug carried on and formed integral with said cross piece and positioned adjacent but below the centrally located opening formed therein, the projecting arms of said lug being disposed in substantial parallelism relative to said cross piece and with end portions arcuately curved forwardly.

5. A new and improved fish hook connector and spreader of the type described, comprising a U-shaped member consisting of a horizontal cross piece having a substantially centrally positioned opening formed therein and a pair of arms formed integral with and forwardly extending from end portions of said cross piece, each of said arms having an opening formed therein adapted to receive an end loop portion of a flexible line carrying a fish hook, a horizontally positioned backwardly projecting substantially flattened annular shaped member carried on and formed integral with said cross piece and positioned adjacent but above the centrally located opening formed therein, the inner portion of said annular member and adjoining part of said cross piece being formed to provide a vertical channel opening into the annular member and extending to and communicating with the centrally positioned opening in the cross piece, the outer portion of said annular member being broken near a side thereof to provide a passage therethrough, and a T-shaped lug carried on and formed integral with said cross piece and positioned adjacent but below the centrally located opening formed therein, the projecting arms of said lug being disposed in substantial parallelism relative to said cross piece and with end portions arcuately curved forwardly.

OTTO BULOW.